United States Patent
Schlör et al.

[11] Patent Number: 5,958,097
[45] Date of Patent: Sep. 28, 1999

[54] FILTER INSERT

[75] Inventors: Ulrich Schlör, Darmstadt; Udo Michaelis, Weiterstadt; Jörgen Knudsen, Angelbachtal, all of Germany

[73] Assignee: Firma Carl Freudenberg, Weinheim, Germany

[21] Appl. No.: 09/102,064

[22] Filed: Jun. 22, 1998

Related U.S. Application Data

[62] Division of application No. 08/910,826, Aug. 13, 1997, Pat. No. 5,863,482.

[30] Foreign Application Priority Data

Aug. 13, 1996 [DE] Germany ............................. P19632618

[51] Int. Cl.⁶ .................................................. B01D 29/07
[52] U.S. Cl. ................................ 55/497; 55/500; 55/502; 55/511; 55/521; 55/DIG. 5; 123/198 E; 264/251; 264/254
[58] Field of Search ............................. 55/497, 500, 502, 55/511, 521, 385.3, DIG. 5; 123/198 E; 210/483, 493.1, 493.3, 493.5, 494.3; 156/73.1; 264/251, 254

[56] References Cited

U.S. PATENT DOCUMENTS

| | | | |
|---|---|---|---|
| 4,882,055 | 11/1989 | Stamstad | 210/482 |
| 5,167,740 | 12/1992 | Michaelis et al. | 55/521 |
| 5,512,172 | 4/1996 | Marble | 55/521 |
| 5,595,582 | 1/1997 | Junker | 55/521 |
| 5,618,324 | 4/1997 | Sommer et al. | 55/497 |
| 5,620,505 | 4/1997 | Koch et al. | 55/497 |
| 5,679,122 | 10/1997 | Moll et al. | 55/497 |

*Primary Examiner*—Jay H. Woo
*Assistant Examiner*—Minh-Chau T. Pham
*Attorney, Agent, or Firm*—Kenyon & Kenyon

[57] ABSTRACT

A filter insert. The filter insert includes an accordion fold pack that is made of a filter material and is joined to a filter frame. The material of the filter frame is injected in a flowable state into the folds of the accordion fold pack which are open in the on-coming flow direction of the medium to be filtered. The material is subsequently hardened during automatic claw fixation with the fold walls. The entire peripheral edge of the accordion fold pack sealingly overlaps the outer boundary surfaces of the filter frame, and is designed as a sealing device.

6 Claims, 1 Drawing Sheet

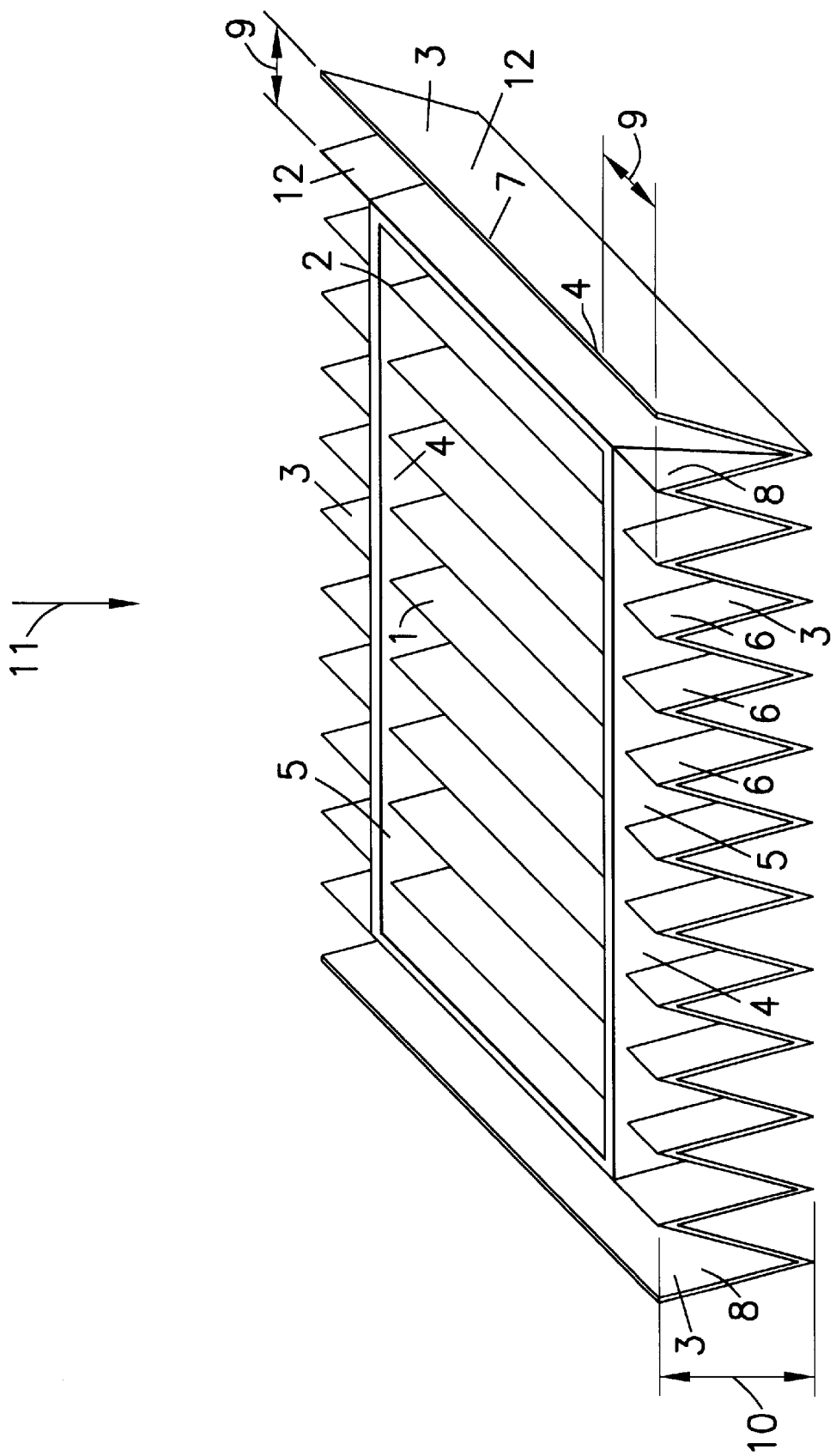

FILTER INSERT

This application is a divisional of prior application Ser. No. 08/910,826, filed Aug. 13, 1997, and now U.S. Pat. No. 5,863,482.

BACKGROUND OF THE INVENTION

1. Field of the Invention

The present invention relates to a filter insert and a method for its manufacture. The filter insert includes an accordion fold pack that is made of a filter material and is joined to a filter frame.

2. Description of the Prior Art

A method for making a filter is shown in DE 42 02 769 A1. This filter insert is made of a fusible, zig-zag folded, web material having closed folds on the end faces, the filter insert being tightly insertable at the edges into a housing, to separate a clean space lying downstream. The end faces of the folds are formed to make enlarged end surfaces upon which a sealing material can be applied, the enlarged end surfaces being produced by fusing and crushing the filter web material. The end surfaces of the leading edges of the folds form a frame-like, closed composite or continuous rim. A sealing strip made of an elastomeric material—for example, a foam—is stuck as an edge sealing onto the composite, the sealing strip enclosing the filter insert all around on the outside. The composite is bonded to the sealing strip, for example, using a sealing, uninterrupted adhesive layer on the side of the sealing strip facing the composite.

SUMMARY OF THE INVENTION

The object of the present invention is to further develop a filter insert in such a way that a separately produced sealing device bonded to the accordion fold pack is no longer needed to seal the filter insert with respect to the housing. A further object is to simplify the production of the filter frame, as well as its joining to the accordion fold pack.

To fulfill the objective of the present invention, the material of the filter frame is injected in a flowable state into the folds of the accordion fold pack, which are open in the direction of the on-coming flow of the medium to be filtered, and is subsequently hardened during its automatic claw fixation with the walls of the folds. The method is advantageous in that the production of the filter frame and its bonding to the accordion fold pack are carried out in just one procedure. The material of the filter frame is introduced into the folds of the accordion fold pack by injection molding and subsequently hardened by cooling. The cooling can be carried out gradually, for example, by exposing the filter frame to ambient temperature.

The entire peripheral edge of the accordion fold pack sealingly overlaps the outer boundary surfaces of the filter frame, and is designed as a sealing device. Therefore, a separately produced sealing device joined to the accordion fold pack by an additional manufacturing step is not needed to seal the filter insert with respect to a housing. Thus, the material the accordion fold pack is made of is used both as a filter medium and as a sealing device. The sealing to the housing is effected, for example, by turning down or laying down the peripheral edge of the accordion fold pack. The filter insert according to the invention is made of just two different materials, namely, the materials from which the accordion fold pack and the filter frame are made.

Preferably, the accordion fold pack is made of a pleated, non-woven fabric. The filter frame is constructed closed upon itself, i.e., in one piece, and is made preferably of a polymeric material injection-molded onto the accordion fold pack. The non-woven fabric can be triboelectrically charged to improve the filter properties and the bonding of the filtered-out particles to the filter material.

Because the filter frame is injection-molded directly onto the accordion fold pack, the filter insert is particularly easy to manufacture and to handle. The accordion fold pack and the filter frame form an integrally and continuously configured unit which can be preassembled. Because the material from which the filter frame is made is injected in the flowable state into the folds of the accordion fold pack, an impervious and extremely durable bonding of the accordion fold pack to the filter frame is created. Following curing, the filter frame is tough.

The longitudinal sides of the filter frame are comb-like and have a congruent shape adapted to mate to the shape of the folds. The filter frame overlaps the fold backs facing the direction of the on-flowing medium. The clean-air side is sealed with respect to the on-coming flow side of the filter insert by the peripheral edges of the accordion fold pack which are designed as a sealing device. Because in each case the longitudinal sides of the filter frame abut against the fold walls defining the folds, the folds are held in position relative to one another.

The end faces of the filter frame join the longitudinal sides and are arranged in the end-face final folds of the accordion fold pack. During normal use of the filter insert, the end-face fold walls of the accordion fold pack, which form a component of the final folds, abut, under elastic prestressing, against the inside wall of a filter housing.

The width of the projection with which the accordion fold pack overlaps the boundary surfaces corresponds essentially to the height of the accordion fold pack. By turning down or laying down the projection, a sealing surface is formed which is able to be forced into sealing engagement with the inside wall of the filter housing.

BRIEF DESCRIPTION OF THE DRAWING

An exemplary embodiment of the filter insert according to the present invention is shown in the drawing, and is described more precisely below.

DETAILED DESCRIPTION OF THE INVENTION

The drawing shows an exemplary embodiment of a filter insert, which includes an accordion fold pack 1 and a filter frame 2. Accordion fold pack 1 is made of a pleated non-woven fabric. Filter frame 2 is arranged in the folds 6 on the side of accordion fold pack 1 facing the on-coming flow direction 11.

The material of which filter frame 2 is made is injected directly into the folds 6 using an injection-molding process. After the frame 2 material has hardened, filter frame 2 maintains the shape of accordion fold pack 1 as a whole, and keeps the individual folds 6 at a predefined distance from one another. The sealing with respect to a filter housing, not shown in the drawing, is effected by the edges 3 of accordion fold pack 1 which are constructed as projection 9 and overlaps the outer boundary surfaces 4 of filter frame 2. The sealing to the filter housing is effected by turning down or laying down the circumferential projections 9.

In the method for manufacturing the filter insert, the accordion fold pack 1 is made of a filter material and is thereafter joined to the filter frame 2. The material of the filter frame 2 is injected, in a flowable state, into the folds 6 of the accordion fold pack 1 which are open in the flow direction 11 of the medium to be filtered. The material of the filter frame 2 is subsequently hardened, during automatic claw fixation with the fold walls 12. It is to be understood that during automatic claw fixation, the material of the filter frame 2 is injected in a free-flowing state into the open folds 6 of the accordion fold pack 1. The free-flowing filter-frame material penetrates at least partially into the filter material of the accordion fold pack 1. If the material of the filter frame 2, which previously was capable of flowing, is cooled off, this material, and specifically also the parts of the material which have penetrated into the filter material of the accordion fold pack 1, hardens. During hardening, the parts of the filter material of the accordion fold pack 1 automatically sink their claws into (fix with) the material of the filter frame. Following cooling, the bond of the accordion fold pack 1 to the filter frame 2 is permanent.

The entire peripheral edge 3 of accordion fold pack 1 sealingly overlaps the outer boundary surfaces 4 of filter frame 2, and therefore is designed as a sealing device for the filter insert. The accordion fold pack 1 may be made of a pleated non-woven fabric. The filter frame 2 is constructed in one piece, i.e., closed upon itself, and is made of a polymeric material injection-molded onto accordion fold pack 1. The longitudinal sides 5 of filter frame 2 are comb-like, i.e., form spaced teeth which fit within folds 6, and have a congruent shape adapted to mate with the shape of folds 6. The end faces 7 of filter frame 2 connect the longitudinal sides 5 and are arranged in the end-face final folds 8 of accordion fold pack 1. The width of projection 9 with which accordion fold pack 1 overlaps boundary surfaces 4 corresponds essentially to the height 10 of accordion fold pack 1.

We claim:

1. A filter insert comprising:

an accordion fold pack made of a filter material, the accordion fold pack including a peripheral edge; and a filter frame including outer boundary surfaces, the accordion fold pack being joined to the filter frame, the peripheral edge of the accordion fold pack sealingly overlapping and projecting from the outer boundary surfaces of the filter frame, the peripheral edge acting as a sealing device.

2. The filter insert of claim 1, wherein:

the accordion fold pack is made of a pleated non-woven fabric.

3. The filter insert of claim 1, wherein:

the filter frame is made of a polymeric material injection-molded onto the accordion fold pack.

4. The filter insert of claim 1, wherein:

the filter frame includes longitudinal sides which are comb-shaped and have a congruent shape conforming to the shape of the folds.

5. The filter insert of claim 1, wherein:

the filter frame includes end faces and longitudinal sides, the end faces connecting the longitudinal sides, the accordion fold pack including end-face final folds, the end faces being arranged in the end-face final folds of the accordion fold pack.

6. The filter insert of claim 1, wherein:

the width of the peripheral edge of the accordion fold pack which overlaps the outer boundary surfaces corresponds essentially to the height of the accordion fold pack.

\* \* \* \* \*